United States Patent [19]

Gutleber

[11] 4,455,662

[45] Jun. 19, 1984

[54] NOISE CODE GENERATOR AND PULSE COMPRESSION COMMUNICATIONS SYSTEM

[76] Inventor: Frank S. Gutleber, 24 Carriage House La., Little Silver, N.J. 07739

[21] Appl. No.: 497,956

[22] Filed: May 25, 1983

[51] Int. Cl.³ .................... H04J 13/00; H03K 13/24
[52] U.S. Cl. ............................ 375/25; 340/347 DD; 370/18; 375/38
[58] Field of Search .................... 370/18–22, 370/53, 69.1, 77, 85, 104, 116; 375/1, 25, 38, 96, 102, 104; 340/348, 349, 346, 347 DD; 455/306; 364/604, 725, 728, 819, 826

[56] References Cited

U.S. PATENT DOCUMENTS

| | | | |
|---|---|---|---|
| 3,461,451 | 8/1969 | Gutleber | 340/348 |
| 3,917,999 | 11/1975 | Gutleber | 375/1 |
| 3,947,674 | 3/1976 | Gutleber | 370/18 X |
| 4,293,953 | 10/1981 | Gutleber | 375/25 |

OTHER PUBLICATIONS

Weik, Martin H., *Communications Standard Dictionary*, Van Nostrand Reinhold Company, 1983, pp. 56, 200.

Primary Examiner—Robert L. Griffin
Assistant Examiner—Albert W. Watkins
Attorney, Agent, or Firm—Anthony T. Lane; Jeremiah G. Murray

[57] ABSTRACT

Expanded multiplexed noise codes formed from code mate pairs of equal code length and having autocorrelation functions which upon detection provides an impulse autocorrelation function are generated by delaying one of the code mate pairs (code b) by a time delay less than its code length and adding it to the other code mate pair (code a) to form a first expanded code mate (code A) while a second expanded code mate (code B) is generated by forming the complement of the delayed code b and adding it to code a. Such partial overlapping results in expanded codes which also compress to an impulse when detected with a matched filter. These expanded codes, moreover, are utilized in multiplexed noise code modulated communications systems.

24 Claims, 4 Drawing Figures

FIG.1
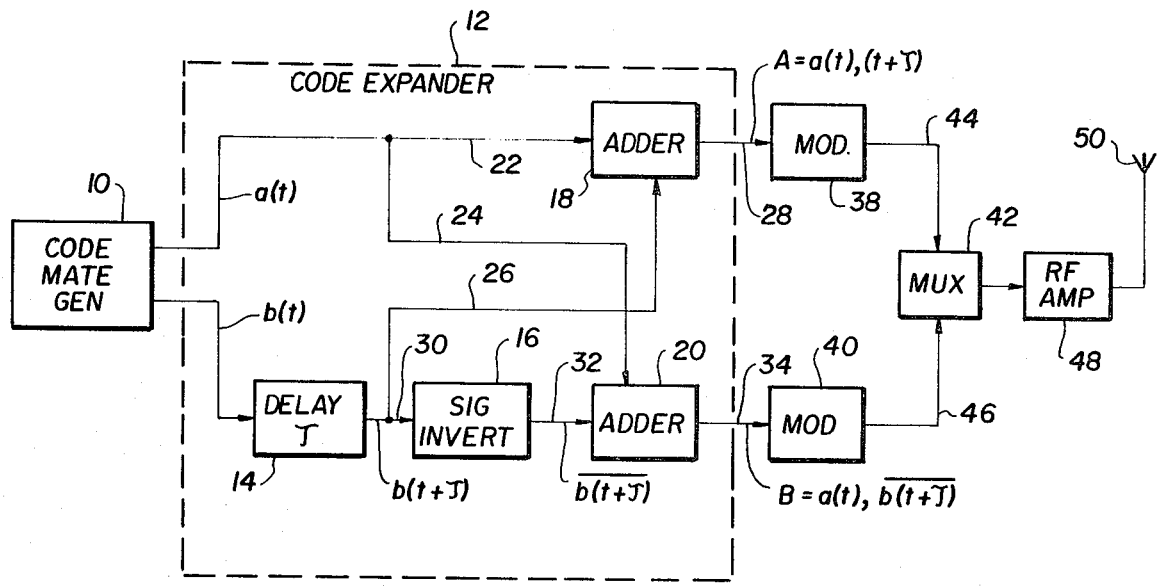
FIG.2
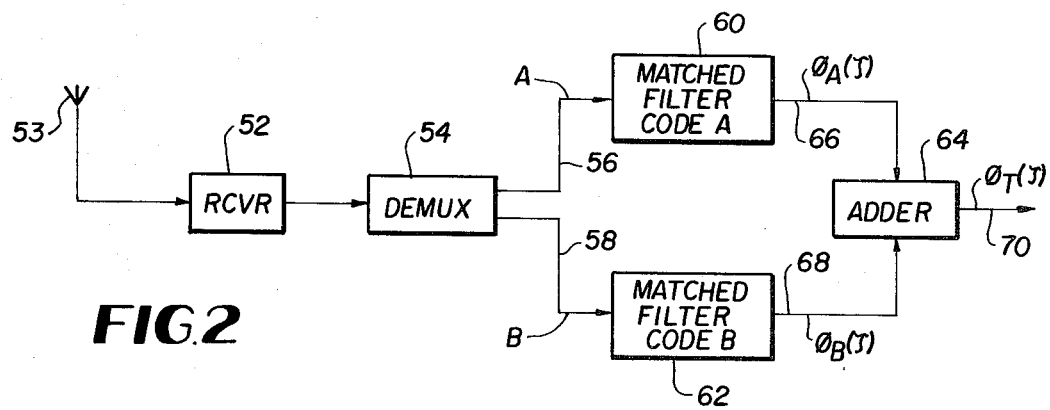
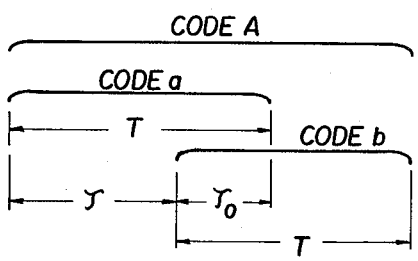
FIG.3A
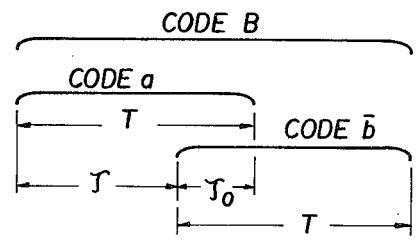
FIG.3B

NOISE CODE GENERATOR AND PULSE COMPRESSION COMMUNICATIONS SYSTEM

The invention described herein may be manufactured, used and licensed by or for the Government for governmental purposes without the payment to me of any royalties thereon or therefor.

CROSS REFERENCE TO RELATED APPLICATIONS

This invention is related to the following co-pending applications filed in the name of the present inventor:

U.S. Ser. No. 499,727, entitled, "A Passive Code Generator For Interleaved Multiplexed Noise Codes," filed on May 31, 1983;

U.S. Ser. No. 502,416, entitled, "A Passive Matched Filter For Compressing Interleaved Multiplexed Noise Codes," filed on June 8, 1983;

U.S. Ser. No. 506,946, entitled, "Code Expansion Generator," filed on June 22, 1983;

U.S. Ser. No. 449,029, entitled, "Multiplexed Noise Code Generator Utilizing Transposed Codes," filed on Dec. 13, 1982; and U.S. Ser. No. 456,157, entitled, "Pulse Compression For Multiplexed Noise Codes," filed on Jan. 6, 1983.

FIELD OF THE INVENTION

This invention relates generally to the generation of multiplexed noise codes having autocorrelation functions which upon detection with a matched filter provide an impulse and communications system employing such codes, and more particularly to the generation and utilization of noise code mates resulting from expansion of overlapping code mate pairs.

BACKGROUND OF THE INVENTION

Radio communications systems utilizing multiplexed noise codes are generally known, a typical example being shown and described in U.S. Pat. No. 4,293,953, entitled, "Bi-Orthogonal PCM Communications System Employing Multiplexed Noise Codes," which issued to Frank S. Gutleber, the present inventor, on Oct. 6, 1981.

The concept of code expansion for the general class of multiplexed noise codes comprised of code mate pairs having autocorrelation functions which upon detection provide an impulse is also generally known. One known expansion concept involves the butting of one code mate with the other code mate and is a technique disclosed, for example, in U.S. Pat. No. 3,461,451, entitled, "Code Generator To Produce Permutations Of Code Mates," which issued to the present inventor on Aug. 12, 1969.

SUMMARY OF THE INVENTION

Accordingly, it is an object of the present invention to provide an improvement in the generation and utilization of multiplexed noise codes.

Another object of the invention is to provide an expansion and utilization of multiplexed noise code mate pairs which result in code mate pairs that are random in both amplitude and phase.

Still a further object of the invention is to provide an expansion and utilization of multiplexed noise code mate pairs into new code mate pairs having autocorrelation functions which upon detection with a matched filter also provides an impulse autocorrelation function.

And yet another object of the invention is to provide a large bandwidth digital noise structure resulting from combining overlapped code mate pairs.

These and other objects are achieved by a method and apparatus for generating and utilizing a pair of expanded codes from a combination of an overlapped basic code mate pair and a pulse code modulated communication system utilizing same, and where the first expanded code is generated by delaying one code mate by a predetermined time delay less than the code width or length of the other code mate and then adding the two together forming a first combined code mate and wherein the second expanded code is generated by forming the complement or negative of the same delayed code mate and adding it to the other code mate forming a second combined code mate. The expanded code mates are applied to respective modulators, thereafter multiplexed and radiated on an RF carrier. Upon being received, demultiplexed and applied to respective matched filters, the outputs are linearly added and an impulse output signal substantially devoid of sidelobes is provided.

BRIEF DESCRIPTION OF THE DRAWINGS

FIG. 1 is a functional block diagram illustrative of the transmitter apparatus of a noise modulated communications system utilizing a pair of expanded multiplexed noise codes generated in accordance with the principles of this invention;

FIG. 2 is a functional block diagram illustrative of receiver apparatus of the noise modulated communications system for use with expanded multiplexed noise codes of this invention; and FIGS. 3A and 3B are diagrams illustrative of the expansion of code mates by partial overlapping.

DESCRIPTION OF THE PREFERRED EMBODIMENT

The present invention is directed to a pulse coded modulated communication system employing a type of multi-bit digital codes referred to as noise codes, meaning that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are multiplexed, matched filter detected and linearly added, there is provided a lobeless impulse output of a relatively high amplitude at one given time ($\tau = 0$) and a zero output at all other times ($\tau \neq 0$). Mathematically, for a pair of code mates a and b, $$\phi_a(\tau) = -\phi_b(\tau) \qquad (1)$$

for all $\tau \neq 0$, where $\phi_a(\tau)$ is the autocorrelation function of code a, $\phi_b(\tau)$ is the autocorrelation function of code b, and where $\tau = 0$ is the location of the main lobe.

Further in accordance with the subject invention, a pair of equal length code mates a and b can be combined to provide an expanded code mate pair A and B of a length greater than code a or b by partially overlapping codes a and b by a predetermined time period $\tau_o$ where $0 < \tau_o < T$ and T is equal to the code length of codes a and b. This is illustrated in FIGS. 3A and 3B. As shown in FIG. 3A, for a basic code mate pair a and b having a respective code length or width T, an expanded code A can be generated by delaying code b by a time delay $\tau$ and adding it to code a. Noting that $\tau + \tau_o = T$, if $\tau$ is equal to zero, then codes a and b would be completely overlapping, whereas if $\tau$ is equal to T, codes a and b would be butted one against the other. In the present invention where partial overlapping of codes a and b is desired and comprises the preferred form, the time delay $\tau$ is greater than zero but less than T. A code mate B for the expanded code A is obtained as shown in FIG. 3B by delaying code b by $\tau$, complementing or providing the negative of the delayed code b and adding it to code a. Mathematically, the expanded codes A and B can be expressed as:

$$A = a(t), b(t+\tau) \qquad (2)$$

$$B = a(t), \overline{b(t+\tau)} \qquad (3)$$

where the comma signifies that code b follows the beginning of code a and begins at a time $t = \tau$. In this manner, a large bandwidth digital noise code structure which is random in both amplitude and phase can readily be generated and which would compress to a lobeless impulse as a result of satisfying equation (1). Also codes a and b can be interchanged, when desirable, to further increase the available quantity of different or unique codes that can be generated.

The following examples are presented to illustrate that when basic code mate pairs are generated and expanded in accordance with the methods set forth above, the expanded code mates also exhibit an impulse autocorrelation function when they are separately detected in a matched filter and linearly added together. Consider, for example, the following code mate pairs a and b:

$$a = 1000 \text{ and } b = 0010,$$

The autocorrelation function $\phi_a(\tau)$ of code a can be obtained in a well known fashion by detection in a matched filter comprised of, for example, a combination of time delay circuits, phase control circuits, and a linear adder, a typical example being shown and described in applicant's prior U.S. Pat. No. 4,293,953, referenced above. Such a matched filter detector develops a digital sequence which can be illustrated as:

$$
\begin{array}{r}
1\ 0\ 0\ 0 \\
1\ 0\ 0\ 0 \\
1\ 0\ 0\ 0 \\
\underline{0\ 1\ 1\ 1} \\
\phi_a(\tau) = 1\ .\ 0\ 0^4 0\ .\ 1 \\
\uparrow \\
\tau = 0
\end{array} \qquad (4)
$$

where 0 denotes a pulse of unit amplitude and positive polarity and 1 denotes a pulse of unit amplitude and negative polarity and wherein the exponent signifies the amplitude of the respective pulses. As shown in equation (4), the main lobe ($\tau = 0$) comprises a positive pulse having an amplitude of 4.

In the same manner, the autocorrelation function $\phi_b(\tau)$ of code b can be developed in a corresponding matched filter detector in the following fashion:

$$
\begin{array}{r}
0\ 0\ 1\ 0 \\
1\ 1\ 0\ 1 \\
0\ 0\ 1\ 0 \\
\underline{0\ 0\ 1\ 0} \\
\phi_b(\tau) = 0\ .\ 1\ 0^4 1\ .\ 0 \\
\uparrow \\
\tau = 0
\end{array} \qquad (5)
$$

From equations (4) and (5) it can be seen that $\phi_a(\tau) = -\phi_b(\tau)$ for all $\tau \neq 0$, and furthermore, when added together, compress to a lobeless impulse at $\tau = 0$, when linearly added together. This is shown below as:

$$
\begin{array}{r}
\phi_a(\tau) = 1\ .\ 0\ 0^4 0\ .\ 1 \\
\phi_b(\tau) = 0\ .\ 1\ 0^4 1\ .\ 0 \\
\hline
\phi_a(\tau) + \phi_b(\tau) = \phi_T(\tau) = \ldots 0^8 \ldots \\
\uparrow \\
\tau = 0
\end{array} \qquad (6)
$$

Now expanding the code mate pair a and b in accordance with equations (2) and (3), with $\tau$ being equal to a 2 bit overlap (the delay is equal to 2 bits), an expanded code mate pair A and B is provided as follows:

$$
\begin{array}{rl}
\text{Code } a = & 1\ 0\ 0\ 0 \\
\text{Code } b = & \underline{\ \ \ \ 0\ 1\ 0\ 0} \\
\text{Code } A = a + b = & 1\ 0\ 0^2.\ 0\ 0
\end{array} \qquad (7)
$$

and $$
\begin{array}{rl}
\text{Code } a = & 1\ 0\ 0\ 0 \\
\text{Code } \bar{b} = & \underline{\ \ \ \ 1\ 0\ 1\ 1} \\
\text{Code } B = a + \bar{b} = & 1\ 0\ .\ 0^2 1\ 1
\end{array} \qquad (8)
$$

That the expanded codes A and B meet the requirements of equation (1) can readily be demonstrated by establishing the autocorrelation functions for codes A and B.

The matched filter compression of code A provides an output $\phi_A(\tau)$ as follows:

$$
\begin{array}{r}
1\ 0\ 0^2.\ 0\ 0 \\
1\ 0\ 0^2.\ 0\ 0 \\
\cdot\ \cdot\ \cdot\ \cdot\ \cdot\ \cdot \\
1^2 0^2 0^4.\ \ 0^2 0^2 \\
1\ 0\ 0^2.\ 0\ 0 \\
\underline{0\ 1\ 1^2.\ 1\ 1} \\
\phi_A(\tau) = 1\ .\ 0^3.\ 0^2 0^8 0^2.\ 0^3.\ 1
\end{array} \qquad (9)
$$

In a like manner, compressing code B provides an output $\phi_B(\tau)$ which is developed as:

$$
\begin{array}{r}
0\ 1\ .\ 1^2 0\ 0 \\
0\ 1\ .\ 1^2 0\ 0 \\
1^2 0^2.\ \ 0^4 1^2 1^2 \\
\cdot\ \cdot\ \cdot\ \cdot\ \cdot\ \cdot \\
1\ 0\ .\ 0^2 1\ 1 \\
\underline{0\ 1\ .\ 1^2 0\ 0} \\
\phi_B(\tau) = 0\ .\ 1^3.\ 1^2 0^8 1^2.\ 1^3.\ 0
\end{array} \qquad (10)
$$

The addition of $\phi_A(\tau)$ and $\phi_B(\tau)$ provides a composite signal $\phi_T(\tau)$ which provides a lobeless signal at $\tau = 0$. This is illustrated below as:

$$\phi_A(\tau) = 1 . 0^3 . 0^2 0^8 \; 0^2 . 0^3 . 1 \quad (11)$$
$$\phi_B(\tau) = 0 . 1^3 . 1^2 0^8 \; 1^2 . 1^3 . 0$$
$$\overline{\phi_T(\tau) = . . . . . 0^{16} . . . . }$$

Consider now an example where an overlap of three digits ($\tau_o = 3$) is provided between codes a and b. A new code A will be generated as follows:

$$\begin{array}{rl} \text{Code } a = & 1\,0\,0\,0 \\ \text{Code } b = & \underline{0\,1\,0\,0} \\ \text{Code } A = a + b = & 1\,0^2.\,0^20 \end{array} \quad (12)$$

Likewise, an expanded code B will be generated as:

$$\begin{array}{rl} \text{Code } a = & 1\,0\,0\,0 \\ \text{Code } \bar{b} = & \underline{1\,0\,1\,1} \\ \text{Code } B = a + \bar{b} = & 1.\,0^2.\,1 \end{array} \quad (13)$$

The autocorrelation functions of expanded codes A and B formed in accordance with equations (12) and (13) are developed as:

$$\phi_A(\tau) = \overline{\begin{array}{c} 1\,0^2\;0^20 \\ 1^20^4\;0^4\;0^2 \\ \cdot\;\cdot\;\cdot\;\cdot\;\cdot\;\cdot \\ 1^20^4\;\cdot\;0^40^2 \\ 0\;1^2\;1^21 \\ \hline 1.\,0^4.\,0^{10}.\,0^4.\,1 \end{array}} \quad (14)$$

and $$\phi_B(\tau) = \overline{\begin{array}{c} 0.\,1^2.\,0 \\ 1^2.\,0^4.\,1^2 \\ \cdot\;\cdot\;\cdot\;\cdot\;\cdot \\ 0.\,1^2.\,0 \\ \hline 0.\,1^4.\,0^6.\,1^4.\,0 \end{array}} \quad (15)$$

Again, the addition of $\phi_A(\tau)$ and $\phi_B(\tau)$ provides a composite signal $\phi_T(\tau)$ which provides a lobeless impulse signal having a single peak value of 16 at $\tau = 0$. This is illustrated below as:

$$\phi_A(\tau) = 1 . 0^4 . 0^{10} . 0^4 . 1 \quad (16)$$
$$\phi_B(\tau) = 0 . 1^4 . 0^6 . 1^4 . 0$$
$$\overline{\phi_T(\tau) = . . . . 0^{16} . . . .}$$

It is also possible to expand the above mate pairs A and B developed in accordance with equations (12) and (13) to provide even greater length mate pairs A' and B' which have greater randomness properties, i.e., they are more noise-like in appearance. Overlapping codes A and B by three digits produces:

$$\begin{array}{rl} \text{Code } A = & 1\,0^2.\,0^20 \\ \text{Code } B = & \underline{1.\,0^2.\,1} \\ \text{Code } A' = A + B = & 1\,0^2\,1\,0^2\,0^3.\,1 \end{array} \quad (17)$$

and $$\begin{array}{rl} \text{Code } \underline{A} = & 1\,0^2.\,0^20 \\ \text{Code } \overline{B} = & \underline{0.\,1^2.\,0} \\ \text{Code } B' = A + \overline{B} = & 1\,0^2\,0\,0^2\,1.\,0 \end{array} \quad (18)$$

Compressing Code A' in a matched filter provides an autocorrelation function output $\phi_{A'}(\tau)$ which is developed as follows:

$$\phi_{A'}(\tau) = \overline{\begin{array}{c} 0\;1^20\;1^21^3.\,0 \\ \cdot\;\cdot\;\cdot\;\cdot\;\cdot \\ 1^30^61^30^60^9.\,1^3 \\ 1^20^41^20^4\;0^6.\,1^2 \\ 0\;1^20\;1^21^3.\,0 \\ 1^20^4\;1^20^40^6.\,1^2 \\ 0\;1^20\;1^21^3.\,0 \\ \hline 0\;1^21^20^21.\,0^{20}.\,1\,0^21^21^20 \end{array}} \quad (19)$$

And as before, compressing code B' in a matched filter provides an autocorrelation output $\phi_{B'}(\tau)$ which is developed as:

$$\phi_{B'}(\tau) = \overline{\begin{array}{c} 1\,0^20\;0^21.\,0 \\ \cdot\;\cdot\;\cdot\;\cdot\;\cdot \\ 0\;1^21\;1^20\;.\,1 \\ 1^20^40^20^4\;1^2.\,0^2 \\ 1\,0^20\;0^21.\,0 \\ 1^20^4\;0^20^41^2.\,0^2 \\ 0\;1^21\;1^20\;.\,1 \\ \hline 1\,0^20^21^20.\,0^{12}.\,0\,1^20^20^21 \end{array}} \quad (20)$$

Adding $\phi_{A'}(\tau)$ and $\phi_{B'}(\tau)$ as before results in a lobeless impulse signal $\phi_T(\tau)$ having a single peak or amplitude of 32 as shown below:

$$\phi_{A'}(\tau) = 0\;1^2\;1^2\;0^2\;1\;.\,0^{20}.\,1\;0^2\;1^2\;1^2\;0 \quad (21)$$
$$\phi_{B'}(\tau) = 1\;0^2\;0^2\;1^2\;0\;.\,0^{12}.\,0\;1^2\;0^2\;0^2\;1$$
$$\overline{\phi_T(\tau) = . . . . . . 0^{32} . . . . . .}$$

Thus there has been shown the manner in which expanded code mates are obtained by partially overlapping two code mate pairs and combining them by linear addition to form new codes having a greater length $T + \tau$ than the original code mates of length T.

Apparatus for implementing the expanded codes A and B in accordance with equations (2) and (3) as well as a noise modulated pulse communication system employing the expanded codes, is disclosed in FIGS. 1 and 2. Referring first to FIG. 1, reference numeral 10 denotes a multi-bit digital signal generator for generating the code mates a and b. These codes are outputted in a time related multi-bit binary digital sequence as signals a(t) and b(t) which are applied to a code expander 12. The code expander 12 is comprised of a combination of well known circuit elements including a digital signal time delay device 14, digital signal inverter 16 and a pair of linear adders 18 and 20.

As shown in FIG. 1, the signal a(t) corresponding to code mate a is commonly fed to the linear adders 18 and 20 via the digital signal lines 22 and 24 while the signal b(t) is fed to the time delay circuit 14 which provides an output signal of b(t+$\tau$). This delayed signal is applied to linear adder 18 by means of digital signal lines 26 whereupon the adder 18 outputs the expanded code mate signal A=a(t), b(t+$\tau$) on signal line 28. The delayed output b(t+$\tau$) of code mate b from the delay line 14 is concurrently fed to the digital signal inverter 16 by means of signal line 30. The inverter 16 provides an output corresponding to the complement or negative of the delayed code mate b signal which is expressed as the signal $\overline{b(t+\tau)}$. This signal is next added to the signal a(t) of code mate a in the linear adder 20 and the combined output comprises the expanded code B which appears on circuit signal lead 34 as the signal B=a(t), $\overline{b(t+\tau)}$.

The expanded code mate signals A and B are applied to respective modulator circuits 38 and 40 comprised of, for example, phase modulators. The outputs of the modulators 38 and 40 comprise separate bi-phase modulated codes which are fed to a multiplexer 42 via signal lines 44 and 46, respectively. The multiplexer 42 may either time or frequency multiplex the code mate pair A and B. The output of the multiplexer 42 is then fed to an RF amplifier 48 where an RF carrier containing the multiplexed codes A and B are radiated from an antenna 50. When desirable, the phase modulators 38 and 40 may provide quadriphase modulation by utilizing bi-phase modulators 90° apart in phase where, for example, modulator 38 modulates code A by 0° and 180° phase changes while modulator 40 modulates code B with 90° and −90° phase changes.

Referring now to FIG. 2, there is disclosed receiver apparatus for being responsive to the RF signal radiated from the antenna 50 and containing the expanded codes A and B. Accordingly, radio receiver apparatus 52 is shown coupled to a receiving antenna 53 which is operable to demodulate the multiplexed codes A and B from the RF carrier whereupon they are fed to a demultiplexer 54. The demultiplexer 54 is operable to output on signal lines 56 and 58, respectively, the expanded codes A and B where they are applied to respective matched filters 60 and 62. The matched filters 60 and 62 are typically of the type shown and described in the aforementioned U.S. Pat. No. 4,293,953 and are operable to compress the codes A and B as described above to provide respective autocorrelation function outputs $\phi_A(\tau)$ and $\phi_B(\tau)$ according to equations (9) and (10), for example. The autocorrelation function outputs of the matched filters 60 and 62 are applied to a linear adder 64 by means of signal lines 66 and 68 which is operable to develop a lobeless impulse output signal $\phi_T(\tau)$ on circuit lead 70 in accordance with equation (11).

Thus what has been shown and described is a noise modulated pulse compression system utilizing a large bandwidth digital noise structure which is random in both amplitude and phase and wherein the noise codes are comprised of expanded codes resulting from the addition of two partially overlapping code mates of equal length.

Having thus shown and described what is at present considered to be the preferred method and means for implementing the subject invention, it is noted that the same has been by way of illustration and not limitation. Accordingly, all modifications, alterations and substitutions may be made without departing from the spirit and scope of the invention as set forth in the appended claims.

I claim:

1. A method of generating a second pair of multi-bit digital codes from a first pair of multi-bit digital codes comprising the steps of:
generating first and second multi-bit digital codes;
generating the complement of said second code;
overlapping said first and second codes by a predetermined time interval which is a function of the code length of said first and second codes;
combining said first and second codes following said overlapping step to form a first expanded code;
overlapping said first code and said complement of said second code by the same said predetermined time interval; and
combining said first code and said complement of said second code following said overlapping step to form a second expanded code.

2. The method as defined by claim 1 wherein said overlapping steps comprise steps of partially overlapping said codes.

3. The method as defined by claim 1 wherein said first and second codes are of equal code length and wherein said predetermined time interval is less than said code length providing thereby partial overlapping of said first and second codes.

4. The method as defined by claim 3 wherein said first and second codes comprise a pair of noise codes.

5. The method as defined by claim 3 wherein said first and second codes comprise binary noise codes which upon matched filter detection produces an impulse autocorrelation function.

6. The method as defined by claim 3 wherein said first and second noise codes are comprised of a pair of code mates which upon autocorrelation function detection and addition compress to a lobeless impulse and wherein said first and second expanded codes comprise a pair of equal length code mates which also compress to a lobeless impulse upon autocorrelation function detection.

7. A method of generating a second pair of equal length multi-bit digital codes from a first pair of equal length multi-bit digital codes comprising the steps of:
generating said first and second multi-bit digital codes;
delaying said second code by a predetermined time delay;
combining the delayed said second code with said first code to form a first expanded code;
generating the complement of the delayed said second code; and
combining the complement of the delayed said second code with said first code to form a second expanded code.

8. The method as defined by claim 7 wherein said steps of combining said first and second codes comprise the step of partially overlapping the delayed said second code relative to said first code and the step of partially overlapping the delayed complement of said second code relative to said first code to, respectively, form said first and second expanded codes.

9. The method as defined by claim 7 wherein said predetermined time delay is a function of the code length of said first and second codes.

10. The method as defined by claim 9 wherein said predetermined time delay comprises a time delay less than the code length of said first and second codes.

11. The method as defined by claim 10 wherein said first and second codes comprise a pair of binary noise codes which upon detection with a matched filter will produce an impulse autocorrelation function.

12. The method as defined by claim 10 wherein said first and second noise codes are comprised of a pair of code mates which upon autocorrelation function detection and addition compress to a lobeless impulse.

13. The method as defined by claim 10 wherein said time delay is substantially a multiple of a code bit time interval of said first and second codes.

14. The method as defined by claim 10 and additionally including the steps of:
multiplexing said first and second expanded codes,
modulating said multiplexed codes on an RF carrier and radiating said carrier;
receiving and demodulating said carrier to provide a multiplexed coded received signal;

demultiplexing said received signal to provide respective coded signals of said first and said second expanded codes;

autocorrelation function detecting said first and second expanded coded signals to provide first and second compressed output signals; and combining said first and second compressed output signals to provide a substantially lobeless impulse output signal.

15. The method as defined by claim 14 wherein said step of autocorrelation function detecting comprises the step of matched filter detecting.

16. The method as defined by claim 14 wherein said steps of combining to form said first and said second expanded codes in claim 7 comprises the steps of linearly adding the respective codes.

17. The method as defined by claim 16 wherein said step of combining said first and second compressed output signals comprises the step of linearly adding said compressed output signals.

18. Apparatus for generating a second pair of multi-bit digital codes from a first pair of multi-bit digital codes, comprising:

code expander means including, means for generating said first and second multi-bit digital codes;

means responsive to said second code for delaying said second code by a predetermined time delay;

means for combining the delayed said second code with said first code to form thereby a first expanded code;

means responsive to said second code for generating the complement of said second code delayed by said predetermined time delay; and means for combining the complement of the delayed said second code with said first code to form thereby a second expanded code.

19. The apparatus as defined by claim 18 wherein said first and second multi-bit digital codes comprise a pair of noise codes.

20. The apparatus as defined by claim 18 wherein said first and second multi-bit digital codes comprise a pair of code mates which upon autocorrelation function detection and addition compress substantially to a lobeless impulse.

21. The apparatus as defined by claim 20 wherein said first and second multi-bit digital codes comprise a pair of code mates and wherein said code expander means is included in radio transmitter means of a communications system including transmitter means and receiver means.

22. The apparatus as defined by claim 21 wherein said transmitter means includes means for multiplexing and modulating said first and second expanded codes on an RF carrier for transmission to said receiver means.

23. The apparatus as defined by claim 21 and wherein said receiver means includes means for demodulating and demultiplexing said first and second expanded codes;

means for autocorrelation function detecting said first and second expanded codes to provide first and second compressed output signals corresponding to said first and second expanded codes; and means for linearly adding said first and second compressed output signals and providing a substantially lobeless output signal thereby.

24. The apparatus as defined by claim 23 wherein said matched filter means comprises a first and second matched filter for respectively detecting and compressing said first and second compressed output signals such that the linear addition of the two compressed signals yields an impulse signal.

* * * * *